(12) United States Patent
Ruthven et al.

(10) Patent No.: US 7,129,442 B2
(45) Date of Patent: Oct. 31, 2006

(54) WELDING MACHINE

(75) Inventors: Dave Ruthven, Wyoming, MI (US); Jeffrey O. Geary, Grand Rapids, MI (US); David Paul De Young, Zeeland, MI (US)

(73) Assignee: Specialty Tooling Systems, Inc., Grand Rapids, MI (US)

( * ) Notice: Subject to any disclaimer, the term of this patent is extended or adjusted under 35 U.S.C. 154(b) by 274 days.

(21) Appl. No.: 10/796,623

(22) Filed: Mar. 9, 2004

(65) Prior Publication Data

US 2005/0199600 A1  Sep. 15, 2005

(51) Int. Cl.
*B23K 9/12* (2006.01)
(52) U.S. Cl. .................. 219/125.11; 228/103
(58) Field of Classification Search ........... 219/125.11, 219/125.1, 60 R, 60 A, 61; 73/847, 814, 73/850; 228/103
See application file for complete search history.

(56) References Cited

U.S. PATENT DOCUMENTS

| | | | |
|---|---|---|---|
| 2,251,324 A | 8/1941 | Carlson | |
| 3,634,648 A | 1/1972 | Morris et al. | |
| 3,783,232 A | 1/1974 | Mengeringhausen et al. | |
| 4,159,650 A * | 7/1979 | Maguire | 73/847 |
| 4,271,346 A | 6/1981 | Hardy | |
| 4,471,201 A | 9/1984 | Hardy | |
| 4,570,047 A | 2/1986 | Vislosky | |
| 5,075,527 A * | 12/1991 | Ikuma | 219/125.11 |
| 6,018,136 A * | 1/2000 | Ohmi et al. | 219/125.11 |

OTHER PUBLICATIONS

Prior art STS Welding Machine, A-1 through A-25, 25 pages.

* cited by examiner

*Primary Examiner*—Clifford C. Shaw
(74) *Attorney, Agent, or Firm*—Price, Heneveld, Cooper, DeWitt & Litton, LLP

(57) ABSTRACT

A welding machine that includes a welding torch assembly, a first rotary head, a second rotary head, a fixture, a processor and a memory subsystem. The first rotary head is configured to receive and selectively retain a first end of a bar and a first link approximate the first end of the bar. The second rotary head is configured to receive and selectively retain a second end of the bar and a second link approximate the second end. The fixture is configured to receive and selectively retain a third link and the fixture is positioned between the first and second rotary heads. The processor is coupled to the welding torch assembly, the first and second rotary heads and the fixture, as well as the memory subsystem.

29 Claims, 9 Drawing Sheets

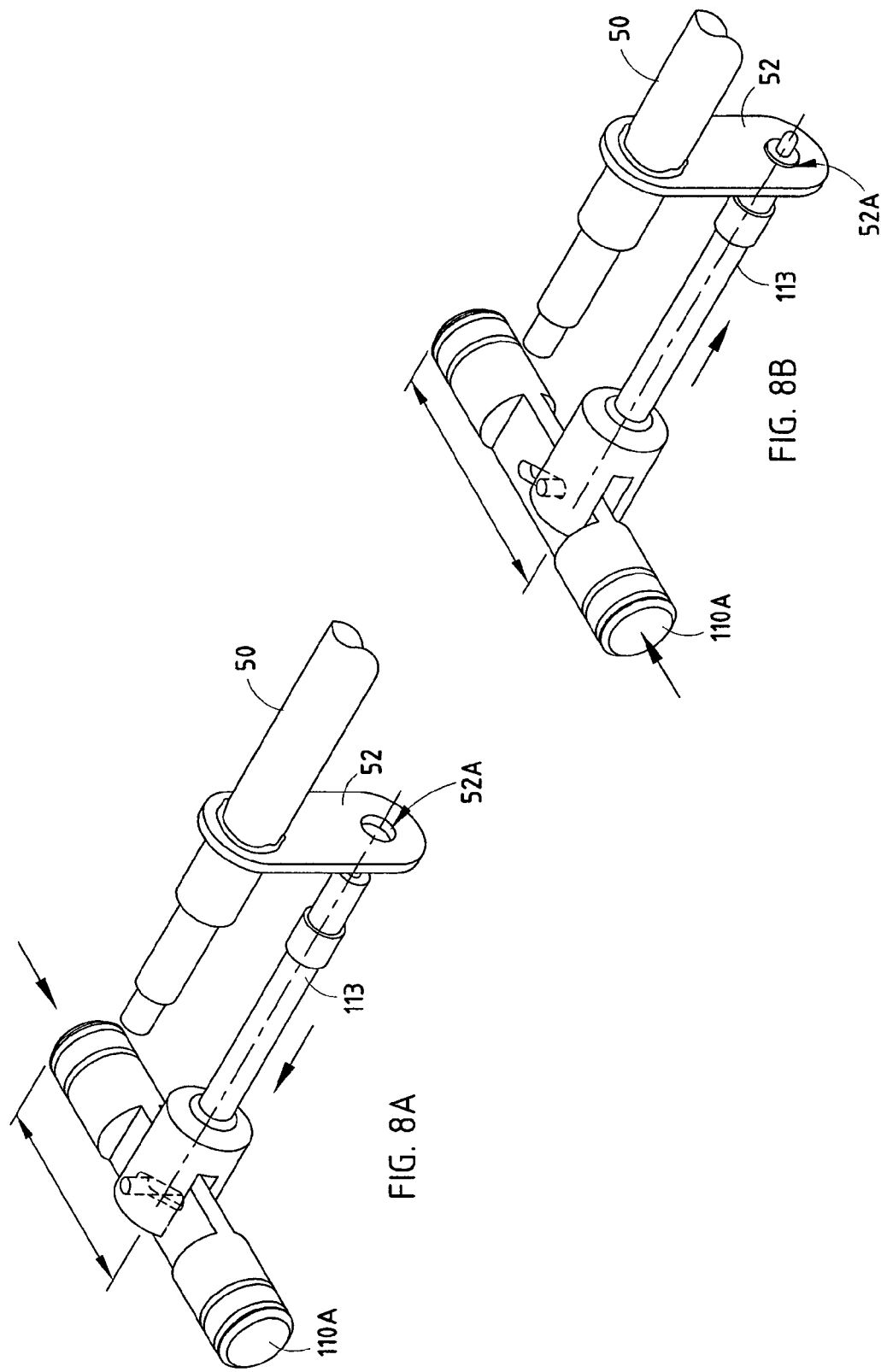

WELDING MACHINE

BACKGROUND OF THE INVENTION

The present invention is generally directed to a welding machine and, more specifically, a welding machine for welding multiple links to a bar.

A number of U.S. patents disclose welding machines that perform welding operations on a cylindrical workpiece. For example, U.S. Pat. No. 4,570,047 is directed to a welding machine that includes a housing that has a head stock section at one end and a tail stock section at an opposite end. The head and tail stock sections each include a rotating chuck. The chucks define a rotating support axis for mounting a workpiece, such as a crankshaft. A carriage, which is mounted for movement on the housing between the head and tail stock sections, includes a welding torch assembly mounted thereto, such that it can be adjustably positioned relative to the workpiece.

U.S. Pat. Nos. 4,471,201 and 4,271,346 are directed to a welding apparatus that includes a frame and a head and tail stock chucks each of which rotatably support a crankshaft relative to the frame. A welding torch is carried by a movable carriage that is shiftable relative to the crankshaft in a direction generally parallel to the central axis of the crankshaft. The welding torch is capable of moving in circular paths such that a tip of the torch closely follows orbiting movement of crank pins and journals of the crankshaft.

U.S. Pat. No. 3,783,232 is directed to an apparatus that is constructed to weld two end sections to opposite ends of a hollow rod. A rotatable holding and clamping device is engaged to hold the two end sections. Each of the rotatable holding and clamping devices may be equipped with a synchronized electric drive motor. The hollow rod and the end sections are initially tacked and the drive motor is engaged to rotate the tacked components while the torches form annular welds to affix the end sections to the hollow rod. U.S. Pat. No. 3,634,648 is directed to an apparatus for welding a pair of flanges about a periphery of a cylindrical member to form an axle shaft or to weld a pair of spider brakes onto an axle shaft.

U.S. Pat. No. 2,251,324 is directed to a combined assembling press and welding machine that attaches fittings to an end of a shaft by rotating the fittings and the shaft during a welding operation. While a number of the U.S. patents described above disclose a welding machine that independently positions and welds two components to a cylindrical workpiece, without removing the workpiece from the machine, none of the above-described U.S. patents disclose a welding machine that welds more than two components to a cylindrical workpiece, without requiring removal of the workpiece from the machine.

What is needed is a welding machine that is capable of welding more than two components to a cylindrical workpiece, without requiring removal of the workpiece from the machine. It would also be desirable if the welding machine was capable of automatically unloading the completed assembly after the welding operation is complete.

SUMMARY OF THE INVENTION

One embodiment of the present invention is directed to a welding machine that includes a welding torch assembly, a first rotary head, a second rotary head, a fixture, a processor and a memory subsystem. The first rotary head is configured to receive and selectively retain a first end of a bar and a first link approximate the first end of the bar. The second rotary head is configured to receive and selectively retain a second end of the bar and a second link approximate the second end. The fixture is configured to receive and selectively retain a third link and the fixture is positioned between the first and second rotary heads. The processor is coupled to the welding torch assembly, the first and second rotary heads, the fixture and the memory subsystem. The memory subsystem stores codes that, when executed by the processor, instructs the processor to perform a number of steps. One step includes controlling the first and second rotary heads and the welding torch assembly to weld the first and second links to the bar along at least a portion of the circumference of the bar. Another step includes controlling the welding torch assembly to move and tack weld the third link to the bar at a first desired orientation. Yet another step includes releasing the third link from the fixture and controlling the welding torch assembly and the first and second rotary heads to weld the third link to the bar along at least a portion of the circumference of the bar.

According to a different aspect of the invention, the memory subsystem includes additional code for instructing the processor to perform the additional step of controlling the first and second rotary heads to position the first and second links at a second desired orientation with respect to each other prior to welding the first and second links to the bar.

According to another embodiment of the present invention, the memory subsystem includes additional code for instructing the processor to perform the additional step of controlling the first and second rotary heads to position the first and second links at the first desired orientation with respect to the third link prior to tack welding the third link to the bar.

According to a different aspect of the present invention, the first and second rotary heads each include an associated individually controllable servo motor and the memory subsystem includes additional code for instructing the processor to perform the additional step of controlling the servo motors to position the first and second links at a second desired orientation with respect to each other prior to welding the first and second links to the bar. According to various embodiments of the present invention, the first and second rotary heads are selectively controllable to achieve a 360 degree weld between the first and second links and the bar. According to another aspect of the present invention, the memory subsystem includes additional code for instructing the processor to perform the additional step of controlling the first and second rotary heads to rotate and release the bar to unload the bar from the machine.

The welding machine may also include a first torque transducer coupled to the processor and positioned to measure a torque applied by the first rotary head. In this embodiment, the motor associated with the first rotary head includes a position encoder and the memory subsystem includes additional code for instructing the processor to perform a number of additional steps. One step includes locking the second rotary head. Another step includes controlling the motor associated with the first rotary head to apply a first predetermined torque to the first and second links after the first and second links are welded to the bar. Yet another step includes determining whether the first and second links deflect more than a first predetermined amount, as provided by the position encoder associated with the first rotary head during the application of the first predetermined torque.

According to yet another aspect of the present invention, the memory subsystem includes additional code for instructing the processor to perform further additional steps. These steps include recapturing the third link in the fixture after the third link is welded to the bar and then controlling the motor associated with the first rotary head to apply a second predetermined torque to the third link after the third link is welded to the bar. The processor then determines whether the third link deflects more than a second predetermined amount as provided by the position encoder associated with the first rotary head during the application of the second predetermined torque.

According to a different aspect of the present invention, a welding machine is configured that includes a welding torch assembly, a first rotary head, a second rotary head, a processor and a memory subsystem. The first rotary head is configured to receive and selectively retain a first end of a bar and a first link approximate the first end. The second rotary head is configured to receive and selectively retain a second end of the bar and a second link approximate the second end. The processor is coupled to the welding torch assembly, the first and second rotary heads, the fixture and the memory subsystem. The memory subsystem stores code that, when executed by the processor, instructs the processor to perform a number of steps. One of those steps includes controlling the first and second rotary heads and the welding torch assembly to weld the first and second links to the bar along at least a portion of a circumference of the bar. Another step includes controlling the first and second rotary heads to rotate and release the bar to unload the bar from the machine.

According to the embodiment immediately described above, the welding machine may further include a fixture configured to receive and selectively retain a third link. In this embodiment, the fixture is positioned between the first and second rotary heads and the memory subsystem includes additional code for instructing the processor to perform further additional steps. One step includes controlling the welding torch assembly to tack weld the third link to the bar at a first desired orientation and then releasing the third link from the fixture. The welding torch assembly and the first and second rotary heads are then controlled to weld the third link to the bar along at least a portion of a circumference of the bar.

These and other features, advantages and objects of the present invention will be further understood and appreciated by those skilled in the art by reference to the following specification, claims and appended drawings.

BRIEF DESCRIPTION OF THE DRAWINGS

FIGS. 8–8B are views further depicting the mechanism of FIG. 7, which is located within each of the rotary heads, that is actuated to extend and retract a pin that captures an outer link that is to be welded to a bar;

DETAILED DESCRIPTION OF PREFERRED EMBODIMENTS

The present invention is generally directed to a welding machine for welding links to a bar. More specifically, the present invention is directed to a welding machine for manufacturing torsion bars for an automotive seat. However, it should be appreciated that many of the various embodiments of the present invention are equally applicable to welding machines that broadly perform welding operations on cylindrical workpieces. As used herein, the term "bar" includes both solid and hollow elongated objects, e.g., rods and tubes. In at least one embodiment of the present invention, the welding machine is configured to weld more than two links to a bar without requiring an operator to remove the bar, and its associated links, from the welding machine. This is advantageous as an operator is not required to reposition the bar and its associated links in the welding machine to finish the welding operation, thus, increasing throughput of the welding machine. In general, a welding machine constructed according to the present invention includes a pair of rotary heads that are driven by motors, e.g., servo motors. According to various embodiments of the present invention, the motors include position encoders for providing feedback such that a processor of the welding machine can determine the relative position of the heads with respect to each other. A welding machine configured according to the present invention is generally capable of achieving a 360 degree weld between outer links of the bar. According to a different aspect of the present invention, the welding machine is configured to automatically unload a torsion bar from the machine, when welding operations are complete.

Figure 1:
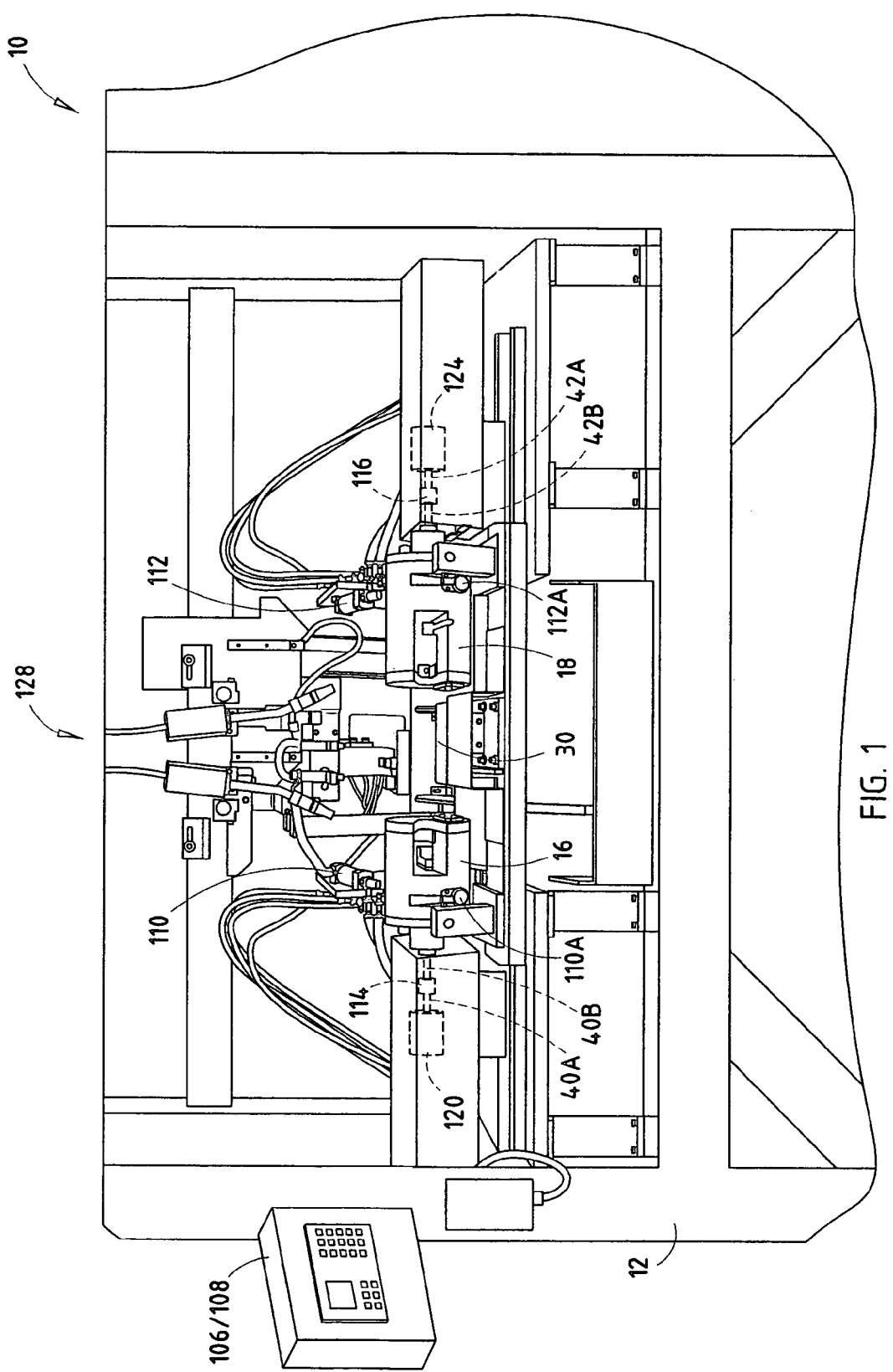
FIG. 1 is a perspective view of a relevant portion of a welding machine, configured according to one embodiment of the present invention.

With reference to FIG. 1, an exemplary welding machine 10, which is configured according to various embodiments of the present invention, is depicted. As is shown, the welding machine 10 includes a welding torch assembly 128, which, in this embodiment, includes two welding torches. The welding torches are mounted to rails and movable in horizontal and vertical positions, through processor control of associated air cylinders, to position the welding torches at a desired orientation to weld links to a bar held by rotary heads 16 and 18. Alternatively, movement of the torches of the welding torch assembly 128 may be achieved by mounting the torches to one or more robotic arms or to controllable motor driven slides. A pair of actuators 110 (only one is shown if FIG. 1) and a pair of actuators 112 (only one is shown if FIG. 1) are remotely controlled to mechanically act on dog bone cams 110A and 112A, which are positioned in the rotary heads 16 and 18, respectively.

Figure 6:
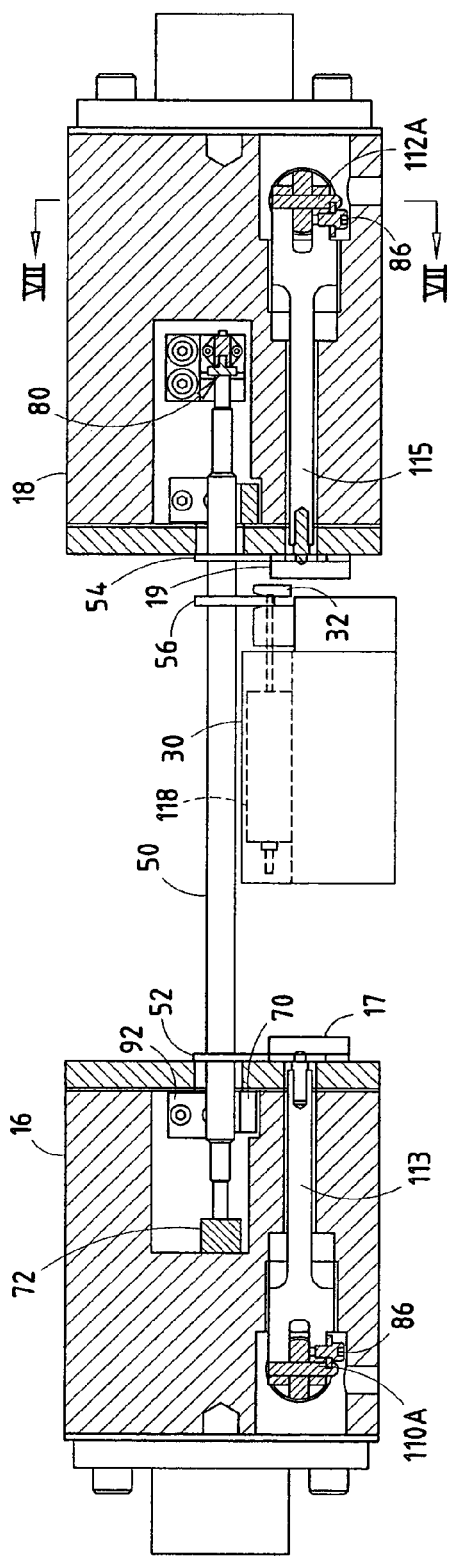
FIG. 6 is a partial cross-sectional view of the rotary heads of the welding machine of FIG. 1, cross-sectioned along the line VI—VI of FIG. 2, detailing how the rotary heads capture ends of a bar and outer links.
Figure 7:
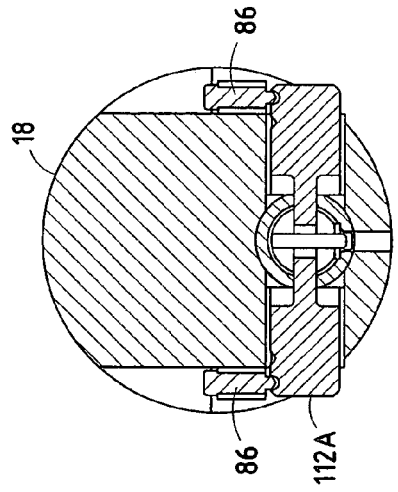
FIG. 7 is a cross-sectional view of a rotary head, along the line VII—VII of FIG. 6, depicting a portion of a mechanism that is actuated to extend and retract a pin that captures an outer link that is to be welded to a bar.

With reference to FIG. 6, actuation of the actuators 110, to act on the dog bone cam 110A, causes a pin 113 within the rotary head 16 to be either extended or retracted to capture a link 52 positioned within a holder 17 mounted to an inner face of the head 16. Similarly, the actuators 112 act on the dog bone cam 112A of the head 18 to extend or retract a pin 115 that captures a link 54 positioned within a holder 19 mounted to an inner face of the head 18. A fixture 30 includes an actuator 118, which is controlled to extend and retract a pin to capture a middle link 56 within a holder 32 mounted to a side of the fixture 30 and hold the link 56 in an appropriate position such that the link 56 can be welded to the bar 50. As used herein the term "actuator" may refer to any electrically controllable device that provides movement of an associated component, e.g., a slug of a solenoid and a pneumatic cylinder.

With reference again to FIG. 1, the rotary head 16 is driven by a motor 120 via shafts 40A and 40B, which are joined by a torque transducer 114. Similarly, a motor 124 drives the rotary head 18 via shafts 42A and 42B, which are joined by a torque transducer 116. The motors 120 and 124 are attached (not specifically shown) to frame 12 in a conventional manner. The rotary heads 16 and 18 are also coupled to the frame 12 by a bearing system (not shown), which allows the heads 16 and 18 to freely rotate 360 degrees. Advantageously, the actuation of the pins 113 and 115, which extend from the rotary heads 16 and 18, respectively, are achieved through mechanical actuation and, as such, do not require the coupling of electrical and/or air lines to the heads 16 and 18. This is desirable in that such electrical and/or air lines, which may require frequent replacement due to damage caused by frequent flexing, are not required. Thus, a welding machine utilizing rotary heads constructed according to this aspect of the invention requires less maintenance.

Figure 1A:
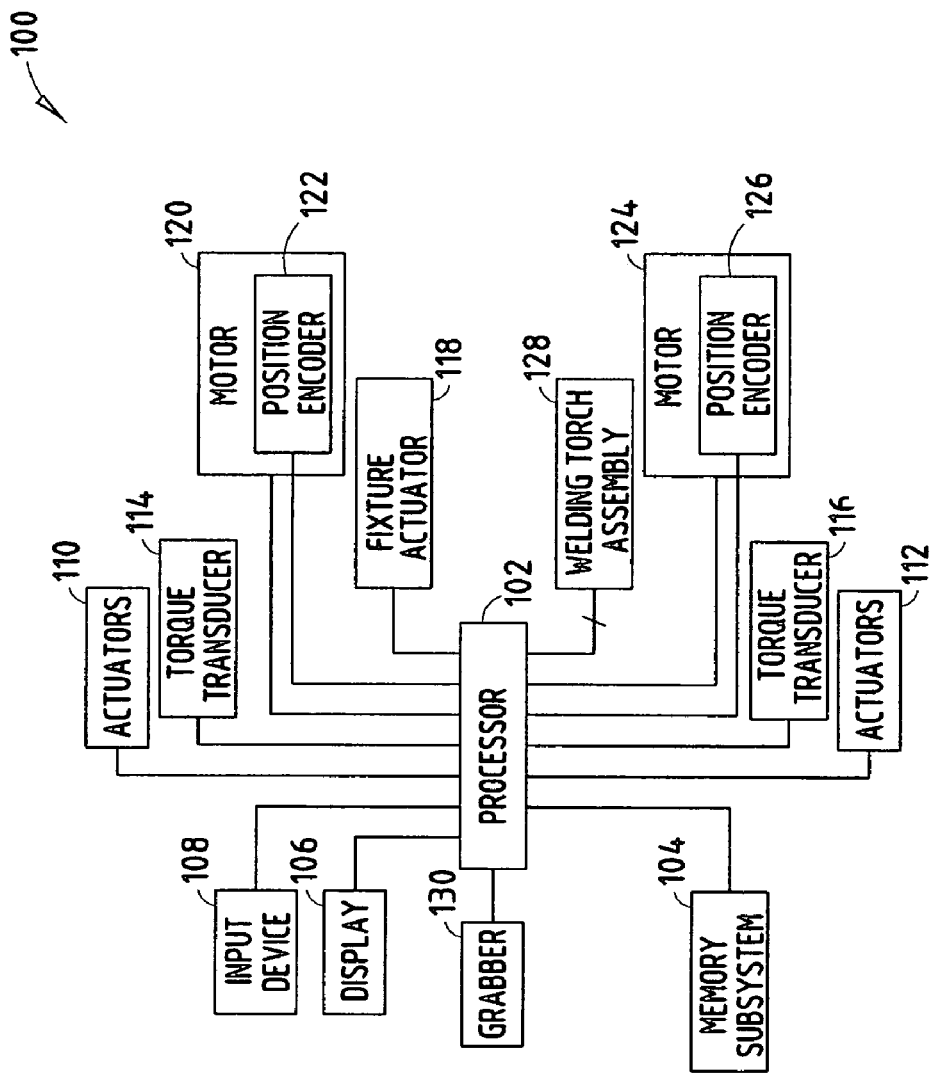
FIG. 1A is an exemplary electrical schematic of a welding machine constructed according to another aspect of the present invention.

With reference to FIG. 1A, an electrical system 100 of the welding machine 10 is shown. The electrical system 100 includes a processor 102 that is coupled to a display 106 and an input device 108. The input device 108 and the display 106 may, if desired, be combined in a single unit. As is further described below, the processor 102 is coupled to a memory subsystem 104, which stores code for programming the processor 102 to control the welding machine 10 to achieve a desired result. The processor 102 is coupled to two pair of actuators 110 and 112, which, as previously discussed, act upon dog bone cams 110A and 112A of the rotary heads 16 and 18, respectively. The processor 102 provides an appropriate signal to the actuators 110 and 112, depending upon whether the pins 113 and 115 associated with the rotary heads 16 and 18, respectively, are to be extracted or retracted. It should be appreciated that the position of the heads 16 and 18, when acted upon by the actuators 110 and 112, respectively, dictate whether the pins 113 and 115 are extended or retracted.

As mentioned above, torque transducers 114 and 116 are positioned to sense a torque provided by the motors 120 and 124, respectively. The torque transducers 114 and 116 are coupled to the processor 102 such that the processor 102 can determine the torque achieved. Each of the motors 120 and 124 include position encoders 122 and 126, respectively. The position encoders 122 and 126 allow the processor 102 to determine the position of the rotary heads 16 and 18 and to adjust the position of the links to be welded to the bar accordingly. Further, one or more of the position encoders 122 and 126 may be utilized in combination with one or more of the torque transducers 114 and 116 to perform torque tests on links of a torsion bar. In this manner, the welding machine 10 can also function as a torque tester and determine whether the welds are satisfactory.

The processor 102 is also coupled to the welding torch assembly 128 and controls both the horizontal and vertical positions of the torches of the welding torch assembly 128, as well as operation of the torches 22 and 24. The processor 102 is coupled to an actuator 118, which serves to extend and retract a pin associated with the fixture 30, such that a middle link can be captured by the fixture 30 and held in an appropriate position with respect to the end links to achieve a desired relationship of the links in the final product. Further, the processor 102 is coupled to and controls an air actuated gripper 130 that is utilized to automatically unload a finished assembly from the rotary heads 16 and 18. As used herein, the term processor may include a general purpose processor, a microcontroller (i.e., an execution unit with memory, etc., integrated within a single integrated circuit), an application specific integrated circuit (ASIC), a programmable logic device (PLD) or a digital signal processor (DSP). Specifically, the processor 102 may be a programmable logic controller (PLC), such as an Allen Bradley SLC 500 programmable controller.

Figure 2:
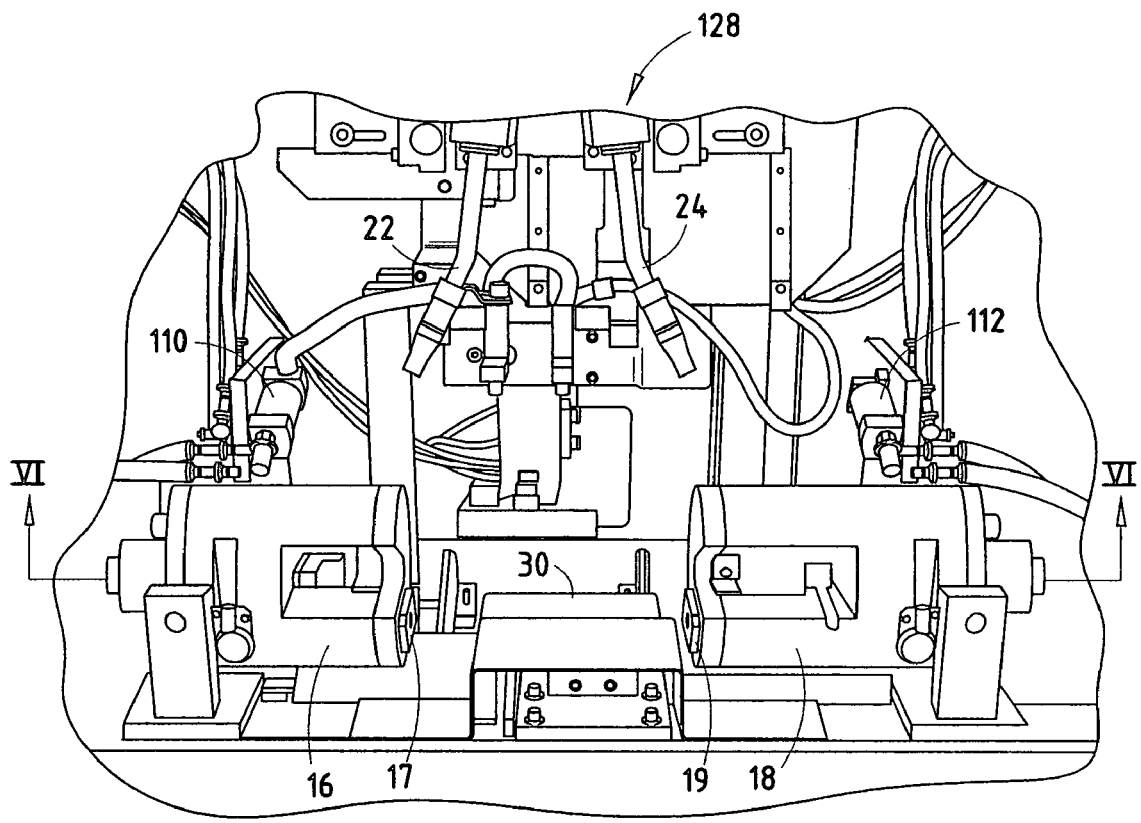
FIG. 2 is a partial perspective view of a welding torch assembly and its initial location relative to first and second rotary heads and a fixture of the welding machine of FIG. 1.
Figure 3:
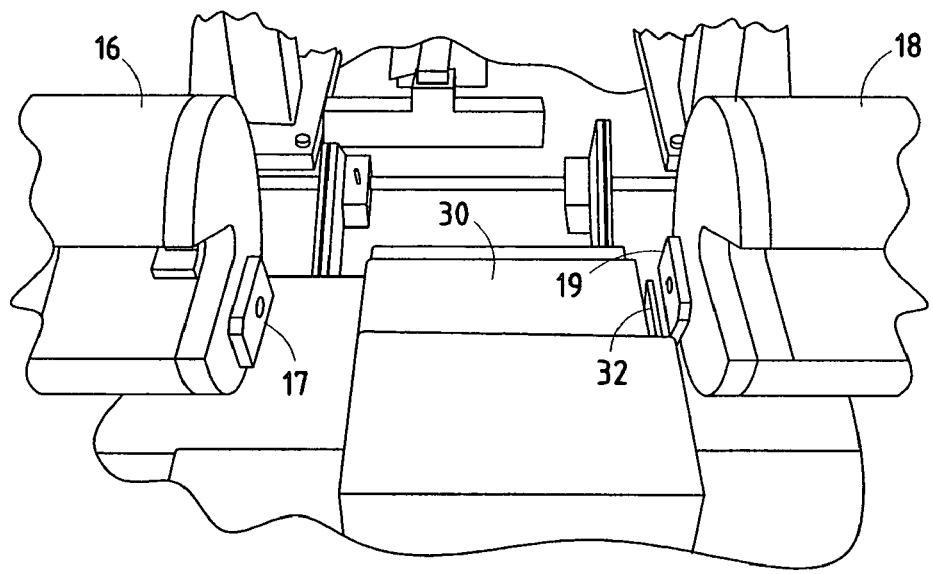
FIG. 3 is a partial perspective view of the first and second rotary heads and the fixture positioned between the first and second rotary heads according to one aspect of the present invention.
Figure 4A:
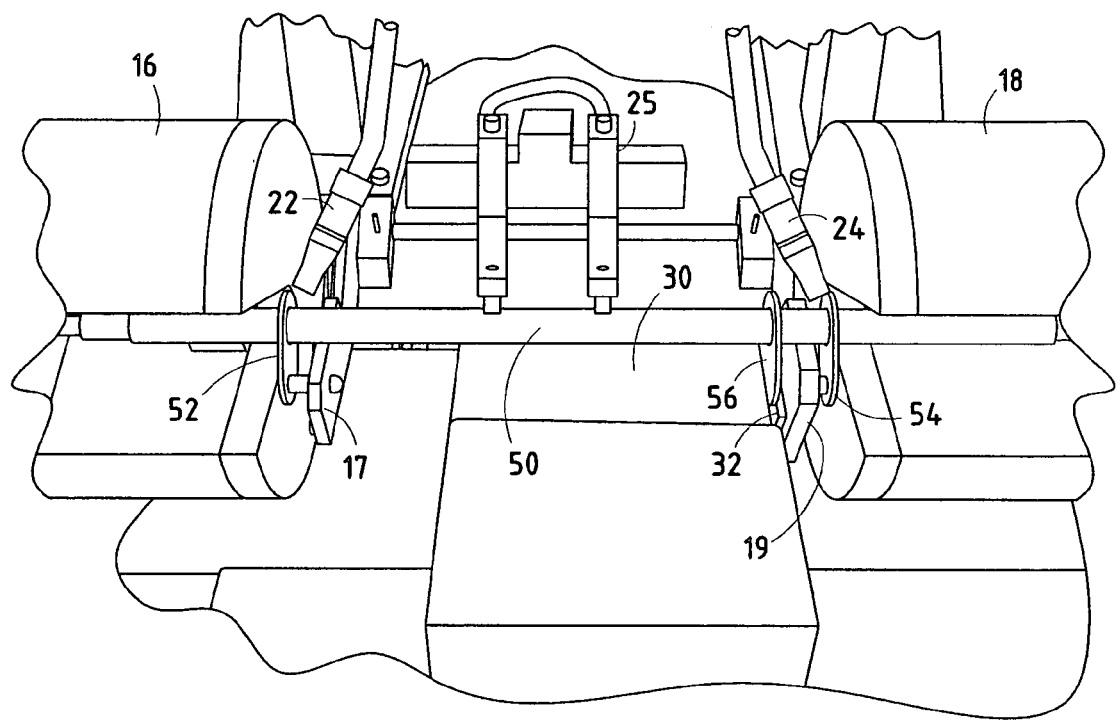
FIG. 4A is a partial perspective view of the welding machine of FIG. 1 with the first and second rotary heads and the welding torch assembly positioned to weld outer links to a bar, whose ends and associated outer links are selectively received and retained by the first and second rotary heads, respectively.
Figure 4B:
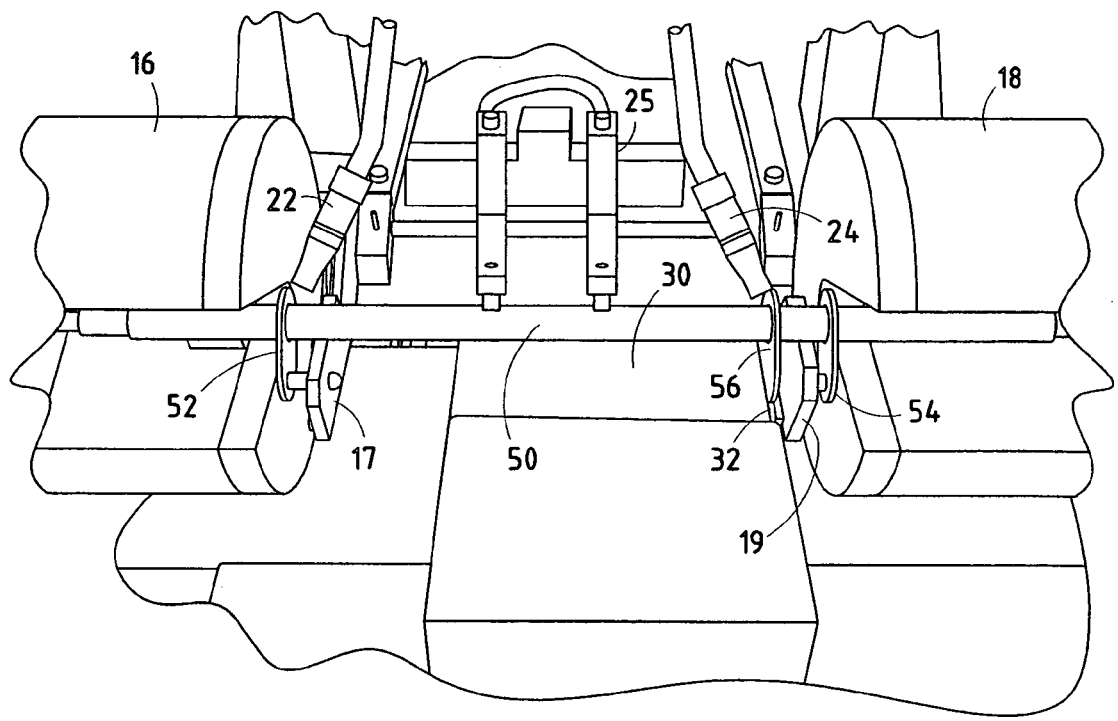
FIG. 4B depicts a relevant portion of the welding machine of FIG. 1 with the welding torch assembly and the first and second rotary heads in a position to weld a middle link to the bar.

With reference to FIG. 2, various components, e.g., the welding torch assembly 128 (and its associated torches 22 and 24), the rotary heads 16 and 18 and the fixture 30, of the welding machine 10 are shown in a load position. As shown, the torches 22 and 24 are in a top vertical and rear horizontal position and the heads 16 and 18 are positioned for an operator to load a bar into the "v-nests of the heads 16 and 18 and the links into the holders 17, 19 and 32. With reference to FIG. 3, the holder 17 of the rotary head 16 and the holder 19 of the rotary head 18, in addition to the holder 32 of the fixture 30, are shown in greater detail. As previously discussed, the rotary heads 16 and 18 and the fixture 30 have pins, which are extended and retracted therefrom, to capture links in their respective holders. With reference to FIG. 4A, ends of a bar 50 are shown positioned within the rotary heads 16 and 18 and a link 52 is shown positioned within the holder 17 of the head 16. Similarly, a link 54 is shown positioned within the holder 19 and a link 56 is shown positioned within the holder 32. As shown in FIG. 4A, the torches 22 and 24 are positioned to weld the outer links 52 and 54 to the bar 50. With reference to FIG. 4B, the torch 24 is shown positioned to weld the link 56 to the bar 50. In both cases, a ground 25 of the welding torch assembly 128 is brought into electrical contact with the bar 50.

Figure 5:
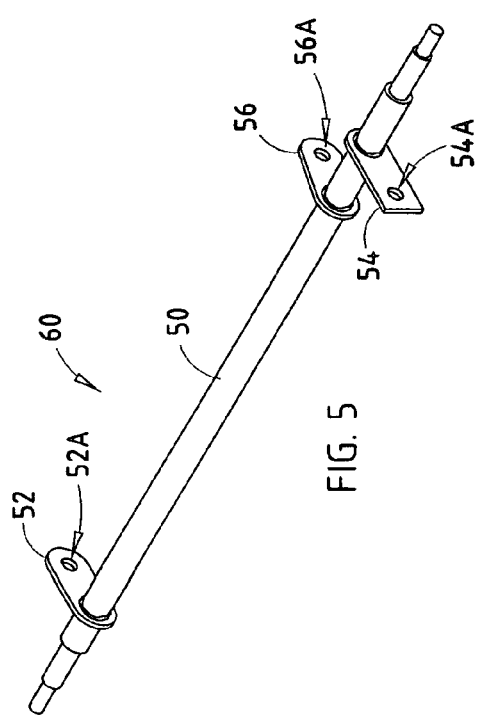
FIG. 5 depicts an exemplary torsion bar for an automotive seat, including a bar and multiple links welded thereto, manufactured using the welding machine of FIG. 1.
Figure 8:
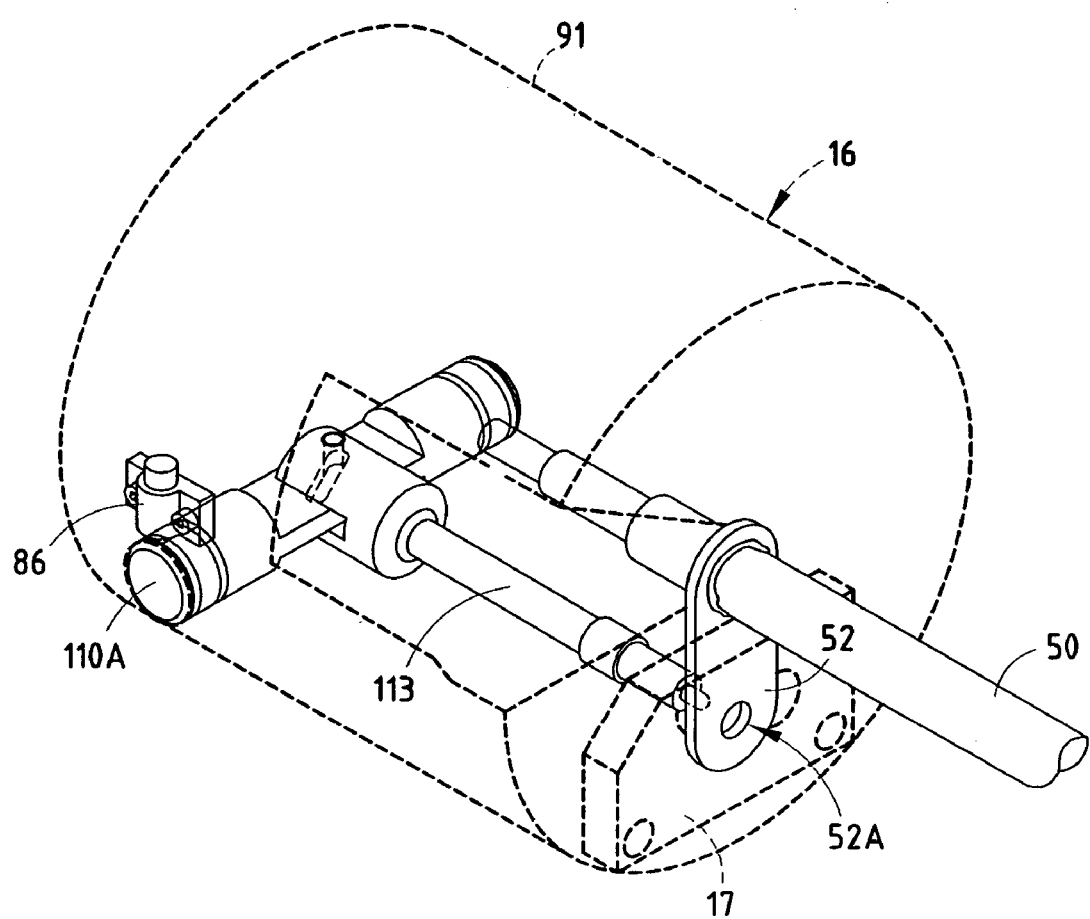
Figure 9:
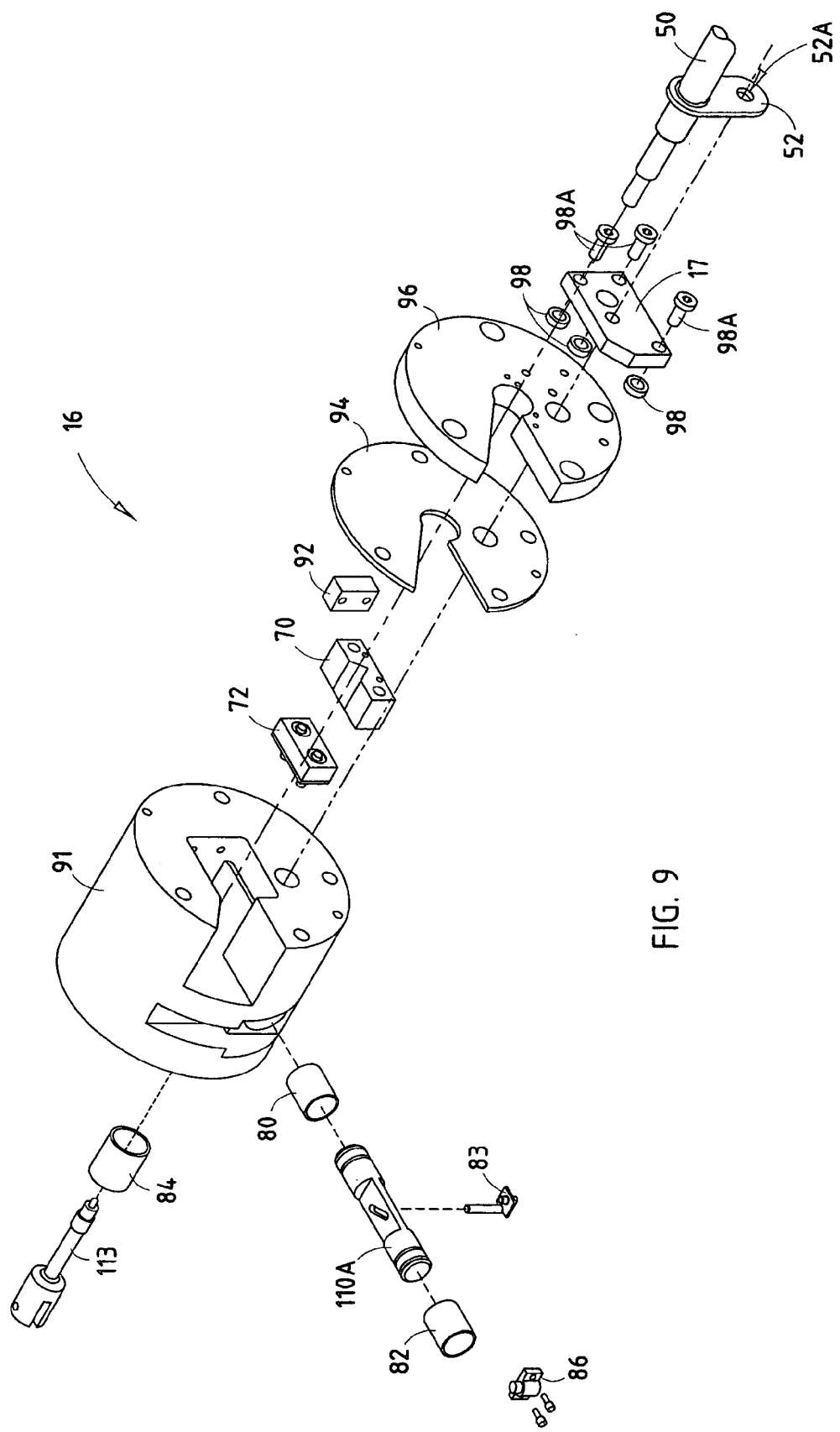
FIG. 9 is an exploded view of the majority of the components of one of the rotary heads.

FIG. 5 depicts an exemplary completed assembly 60, i.e., a torsion bar for an automotive seat, which includes a bar 50 and links 52, 54 and 56 welded thereto. As is shown, each of the links 52, 54 and 56 includes apertures 52A, 54A and 56A, respectively. The apertures 52A, 54A and 56A receive pins that extend from the rotary heads 16 and 18 and the fixture 30, respectively. As disclosed herein, the welding machine 10 includes a single station that is manually loaded. In one embodiment, the welding machine 10 is implemented with two MIG power supplies (one for each of the torches 22 and 24) and two servo driven fixtures or rotary heads, for retaining outer links, and a middle fixture (attached to the frame 12) for assemblies with a third link. It should be appreciated that additional middle fixtures may be required, depending upon the application.

With reference to FIGS. 6-9, prior to welding, links 52, 54 and 56 are manually loaded onto a bar 50 and the assembly is loaded in horizontal attitude into "v-nests" formed in v-block 70 of assembly specific fixtures. When ends of the bar 50 are loaded into the rotary heads 16 and 18, one end of the bar 50 is packed against a positive end-stop 72 (located in the head 16) by a spring loaded packer 80 (located in the head 18). The pin 113 slides through a bushing 84 that is positioned within the housing 91. Similarly, the dog bone cam 110A slides through bushings 80 and 82, which are positioned within the housing 91. A pin 83 is utilized to movably connect the dog bone cam 110A and the pin 113. A plurality of spring loaded detents 86 are attached to the housing 91 at locations to engage circumferential grooves formed adjacent opposite ends of the dog bone cam 110A. Assembly specific inner plates 94 and 96 are attached at an inner face of the housing 91 and outer plates (not shown) are attached to an outer face of the housing 91. Spacers 98 space the holder 17 a desired distance from an inner face of the head 16 and receive bolts 98A that attach the holder 17 to the housing 91. According to one embodiment, the heads 16 and 18 are designed such that the link 52 is placed in a common location for welding. While the description above is primarily directed to the head 16, it should be appreciated that the head 18 is similarly constructed.

Figure 10:
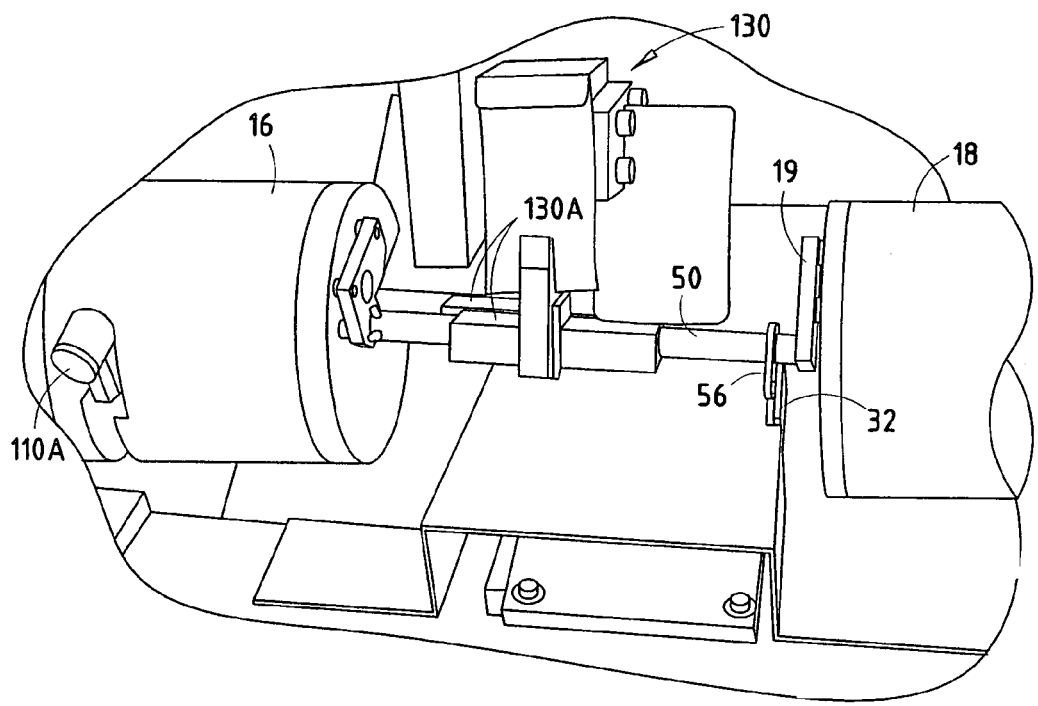
FIG. 10 is a perspective view of a gripper positioned to remove a completed torsion bar from the rotary heads of the welding machine of FIG. 1.
Figure 11:
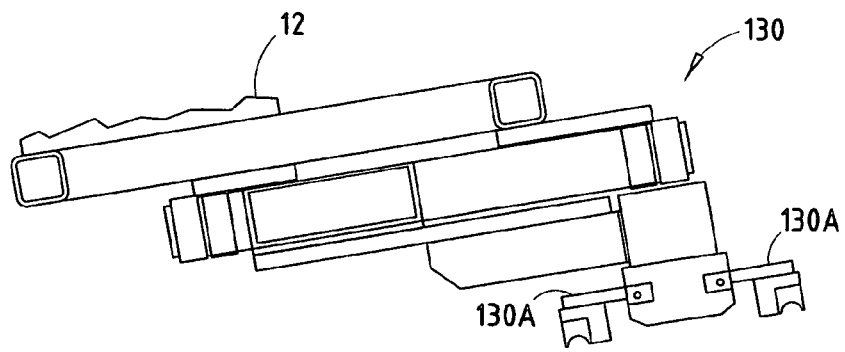
FIG. 11 is partial side view of the gripper of FIG. 10 in a retracted position.

The location of the right outer link and the middle link(s) typically vary based on assembly and, as mentioned above, the torches may be mounted on air actuated slides that are controlled to shift one of the torches from the outside link to the middle link during welding operations. One or more gauge blocks may be implemented for each different assembly to allow for torch location adjustment setup. Assemblies with one or more middle links require a like number of middle fixtures that each include a cylinder actuated locating pin and holder. It should be appreciated that the middle fixtures are also assembly specific and are attached to the frame. The processor 102 may be programmed to provide an assembly selection menu that provides assembly specific welding and fixturing sequences. According to various embodiments of the present invention, upon completion of welding operations, a completed assembly is automatically unloaded onto rails of the welding machine 10 for removal by an operator. With reference to FIGS. 10 and 11, a gripper 130 includes a pair of jaws 130A that are used to grasp the bar 50, when the heads 16 and 18 are properly positioned. The gripper 130 is horizontally and vertically adjustable, e.g., via air cylinders, and is controlled by the processor 102 to remove a completed assembly from the heads 16 and 18 and deliver the assembly to rails of the machine 10 which are positioned to receive the assembly.

According to various embodiments of the present invention, the welding machine may weld parts having two or more links. For example, a typical sequence of operations for a welding machine when it is welding parts with two links would be as follows. The operator initially loads the bar ends into the "v-nests" of the rotary heads with the outer links placed within holders attached to an inner face of the heads, which roughly locate the links and back-up the links, when locating pins enter an aperture in the links. Upon an operator initiating the welding process, locating pins are extended from the rotary heads. The torches of the welding torch assembly are lowered to the assembly and the torches initiate welding of the links to the bar as the rotary heads rotate the assembly. When the weld cycle is complete, the locating pins and the torches are retracted. The rotary heads rotate to an unload position and a processor controlled gripper grabs the bar and automatically unloads the completed assembly from the welding machine, at which point rotary heads rotate back to a load position to allow an operator to load components of a new unfinished assembly into the welding machine.

In operation of the welding machine to weld a part with three links, the operator initially places links on a bar and loads the ends of the bar into the "v-nests" of the rotary heads, with the outer links positioned within holders associated with the heads and a middle link or links placed into a holder or holders of a middle fixture or fixtures. After an operator initiates the welding process, pins are extended from the rotary heads and the middle fixture to retain the links. The torches of the torch assembly are then lowered to the assembly to weld the outer links. One of the torches is then automatically positioned to tack weld the middle link, upon which point the pin associated with the middle link is retracted, releasing the middle link, at which point the torch is controlled to finish welding the middle link to the bar as the rotary heads rotate the assembly. When the cycle is complete, the locating pins in the rotary heads and the torches are retracted and the torch assembly automatically returns to a home position. The rotary heads then rotate to an unload position and a processor controlled gripper grabs the bar and automatically unloads the completed assembly from the welding machine, at which point rotary heads rotate back to a load position to allow an operator to load components of a new unfinished assembly into the welding machine.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A welding machine, comprising:
   a welding torch assembly;
   a first rotary head configured to receive and selectively retain a first end of a bar and a first link approximate the first end;
   a second rotary head configured to receive and selectively retain a second end of the bar and a second link approximate the second end;
   a fixture configured to receive and selectively retain a third link, wherein the fixture is positioned between the first and second rotary heads;
   a processor coupled to the welding torch assembly, the first and second rotary heads and the fixture; and
   a memory subsystem coupled to the processor, the memory subsystem storing code that when executed by the processor instructs the processor to perform the steps of:

controlling the first and second rotary heads and the welding torch assembly to weld the first and second links to the bar along at least a portion of the circumference of the bar;

controlling the welding torch assembly to tack weld the third link to the bar at a first desired orientation;

releasing the third link from the fixture; and controlling the welding torch assembly and the first and second rotary heads to weld the third link to the bar along at least a portion of the circumference of the bar.

2. The machine of claim 1, wherein the memory subsystem includes additional code for instructing the processor to perform the additional step of:

controlling the first and second rotary heads to position the first and second links at a second desired orientation with respect to each other prior to welding the first and second links to the bar.

3. The machine of claim 2, wherein the memory subsystem includes additional code for instructing the processor to perform the additional step of:

controlling the first and second rotary heads to position the first and second links at the first desired orientation with respect to the third link prior to tack welding the third link to the bar.

4. The machine of claim 1, wherein the first and second rotary heads each include an associated individually controllable servo motor and the memory subsystem includes additional code for instructing the processor to perform the additional step of:

controlling the servo motors to position the first and second links at a second desired orientation with respect to each other prior to welding the first and second links to the bar.

5. The machine of claim 4, wherein the memory subsystem includes additional code for instructing the processor to perform the additional step of:

controlling the servo motors to position the first and second links at the first desired orientation with respect to the third link prior to tack welding the third link to the bar.

6. The machine of claim 1, wherein the welding torch assembly includes a first welding torch and a second welding torch that are controlled to simultaneously weld the first link and the second link, respectively, to the bar.

7. The machine of claim 1, wherein first and second rotary heads are selectively controllable to achieve a 360 degree weld between the first and second links and the bar.

8. The machine of claim 1, wherein the memory subsystem includes additional code for instructing the processor to perform the additional step of:

controlling the first and second rotary heads to rotate and release the bar to unload the bar from the machine.

9. The machine of claim 1, further comprising:

a first torque transducer coupled to the processor and positioned to measure a torque applied by the first rotary head, wherein a motor associated with the first rotary head includes a position encoder, and wherein the memory subsystem includes additional code for instructing the processor to perform the additional step of:

locking the second rotary head;

controlling the motor associated with the first rotary head to apply a first predetermined torque to the first and second links after the first and second links are welded to the bar; and determining whether the first and second links deflect more than a first predetermined amount as provided by the position encoder associated with the first rotary head during the application of the first predetermined torque.

10. The machine of claim 9, wherein the memory subsystem includes additional code for instructing the processor to perform the additional step of:

recapturing the third link in the fixture after the third link is welded to the bar;

controlling the motor associated with the first rotary head to apply a second predetermined torque to the third link after the third link is welded to the bar; and determining whether the third link deflects more than a second predetermined amount as provided by the position encoder associated with the first rotary head during the application of the second predetermined torque.

11. A welding machine, comprising:

a welding torch assembly;

a first rotary head configured to receive a first end of a torsion bar for an automotive seat and to receive and selectively retain a first link approximate the first end;

a second rotary head configured to receive a second end of the bar and to receive and selectively retain a second link approximate the second end;

a fixture configured to receive and selectively retain a third link, wherein the fixture is positioned between the first and second rotary heads;

a processor coupled to the welding torch assembly, the first and second rotary heads and the fixture; and a memory subsystem coupled to the processor, the memory subsystem storing code that when executed by the processor instructs the processor to perform the steps of:

controlling the welding torch assembly to weld the first link to the bar along at least a portion of a circumference of the bar;

controlling the welding torch assembly to weld the second link to the bar along at least a portion of the circumference of the bar;

controlling the welding torch assembly to tack weld the third link to the bar at a first desired orientation;

releasing the third link from the fixture; and controlling the welding torch assembly and the first and second rotary heads to weld the third link to the bar along at least a portion of the circumference of the bar.

12. The machine of claim 11, wherein the memory subsystem includes additional code for instructing the processor to perform the additional step of:

controlling the first and second rotary heads to position the first and second links at a second desired orientation with respect to each other prior to welding the first and second links to the bar.

13. The machine of claim 12, wherein the memory subsystem includes additional code for instructing the processor to perform the additional step of:

controlling the first and second rotary heads to position the first and second links at the first desired orientation with respect to the third link prior to tack welding the third link to the bar.

14. The machine of claim 11, wherein the first and second rotary heads each include an individually controllable servo motor and the memory subsystem includes additional code for instructing the processor to perform the additional step of:

controlling the servo motors to position the first and second links at a second desired orientation with respect to each other prior to welding the first and second links to the bar.

15. The machine of claim 14, wherein the memory subsystem includes additional code for instructing the processor to perform the additional step of:
controlling the servo motors to position the first and second links at the first desired orientation with respect to the third link prior to tack welding the third link to the bar.

16. The machine of claim 11, wherein the welding torch assembly includes a first welding torch and a second welding torch that are controlled to simultaneously weld the first link and the second link, respectively, to the bar.

17. The machine of claim 11, wherein first and second rotary heads are selectively controllable to achieve a 360 degree weld between the first and second links and the bar.

18. The machine of claim 11, wherein the memory subsystem includes additional code for instructing the processor to perform the additional step of:
controlling the first and second rotary heads to rotate and release the bar to unload the bar from the machine.

19. The machine of claim 11, further comprising:
a first torque transducer coupled to the processor and positioned to measure a torque applied by the first rotary head, wherein a motor associated with the first rotary head includes a position encoder, and wherein the memory subsystem includes additional code for instructing the processor to perform the additional step of:
locking the second rotary head;
controlling the motor associated with the first rotary head to apply a first predetermined torque to the first and second links after the first and second links are welded to the bar; and
determining whether the first and second links deflect more than a first predetermined amount as provided by the position encoder associated with the first rotary head during the application of the first predetermined torque.

20. The machine of claim 19, wherein the memory subsystem includes additional code for instructing the processor to perform the additional step of:
recapturing the third link in the fixture after the third link is welded to the bar;
controlling the motor to apply a second predetermined torque to the third link after the third link is welded to the bar; and
determining whether the third link deflects more than a second predetermined amount as provided by the position encoder during the application of the second predetermined torque.

21. A test assembly for testing the strength of a weld, comprising:
a first rotary head configured to receive and selectively retain a first end of a bar and a first link approximate the first end, wherein the first link is welded to the bar;
a second rotary head configured to receive and selectively retain a second end of the bar and a second link approximate the second end, wherein the second link is welded to the bar;
a processor electrically coupled to the first and second rotary heads;
a first torque transducer coupled to the processor and positioned to measure a torque applied by the first rotary head, wherein a motor associated with the first rotary head includes a position encoder;
a memory subsystem electrically coupled to the processor, the memory subsystem storing code that when executed by the processor instructs the processor to perform the steps of:
locking the second rotary head;
controlling the motor associated with the first rotary head to apply a first predetermined torque to the first and second links; and
determining whether the first and second links deflect more than a first predetermined amount as provided by the position encoder associated with the first rotary head during the application of the first predetermined torque.

22. The assembly of claim 21, further comprising:
a fixture configured to receive and selectively retain a third link that is welded to the bar, wherein the fixture is coupled to the processor and is positioned between the first and second rotary heads, and wherein the memory subsystem includes additional code for instructing the processor to perform the additional step of:
capturing the third link in the fixture;
controlling the motor to apply a second predetermined torque to the third link; and
determining whether the third link deflects more than a second predetermined amount as provided by the position encoder associated with during the application of the second predetermined torque.

23. The assembly of claim 22, wherein the test assembly further comprises a welding machine that includes:
a welding torch assembly, wherein the processor is coupled to the welding torch assembly and the memory subsystem stores additional code that when executed by the processor instructs the processor to perform the additional steps of:
synchronously controlling the first and second rotary heads while the first and second links are welded to the bar;
controlling the welding torch assembly to tack weld the third link to the bar at a first desired orientation;
releasing the third link from the fixture; and
controlling the welding torch assembly and the first and second rotary heads to weld the third link to the bar along at least a portion of the circumference of the bar.

24. The machine of claim 23, wherein the memory subsystem includes additional code for instructing the processor to perform the additional step of:
controlling the first and second rotary heads to position the first and second links at a second desired orientation with respect to each other prior to welding the first and second links to the bar.

25. The machine of claim 24, wherein the memory subsystem includes additional code for instructing the processor to perform the additional step of:
controlling the first and second rotary heads to position the first and second links at the first desired orientation with respect to the third link prior to tack welding the third link to the bar.

26. The machine of claim 21, wherein the welding torch assembly includes a first welding torch and a second welding torch that are controlled to simultaneously weld the first link and the second link, respectively, to the bar.

27. The machine of claim 21, wherein first and second rotary heads are selectively controllable to achieve a 360 degree weld between the first and second links and the bar.

28. The machine of claim 21, wherein the memory subsystem includes additional code for instructing the processor to perform the additional step of:
controlling the first and second rotary heads to rotate and release the bar to unload the bar from the machine.

29. A welding machine, comprising:
a welding torch assembly;
a first rotary head configured to receive and selectively retain a first end of a bar and a first link approximate the first end;
a second rotary head configured to receive and selectively retain a second end of the bar and a second link approximate the second end;
a fixture configured to receive and selectively retain a third link, wherein the fixture is positioned between the first and second rotary heads;
a processor coupled to the welding torch assembly, the first and second rotary heads and the fixture; and
a memory subsystem coupled to the processor, the memory subsystem storing code that when executed by the processor instructs the processor to perform the steps of:
controlling the first and second rotary heads and the welding torch assembly to weld the first and second links to the bar along at least a portion of the circumference of the bar;
controlling the welding torch assembly to tack weld the third link to the bar at a first desired orientation;
releasing the third link from the fixture;
controlling the welding torch assembly and the first and second rotary heads to weld the third link to the bar along at least a portion of the circumference of the bar; and
controlling the first and second rotary heads to rotate and release the bar to unload the bar from the machine.

* * * * *

UNITED STATES PATENT AND TRADEMARK OFFICE
CERTIFICATE OF CORRECTION

PATENT NO. : 7,129,442 B2 Page 1 of 1
APPLICATION NO. : 10/796623
DATED : October 31, 2006
INVENTOR(S) : Dave Ruthven et al.

It is certified that error appears in the above-identified patent and that said Letters Patent is hereby corrected as shown below:

Column 5, lines 11 and 12, "if" should be --in--.

Column 12, line 29, after "associated with" insert --the first rotary head--.

Signed and Sealed this

Sixth Day of February, 2007

JON W. DUDAS
*Director of the United States Patent and Trademark Office*